July 16, 1940.  A. N. BRUNSON  2,208,014
SURVEYING INSTRUMENT
Filed May 6, 1938  2 Sheets-Sheet 1
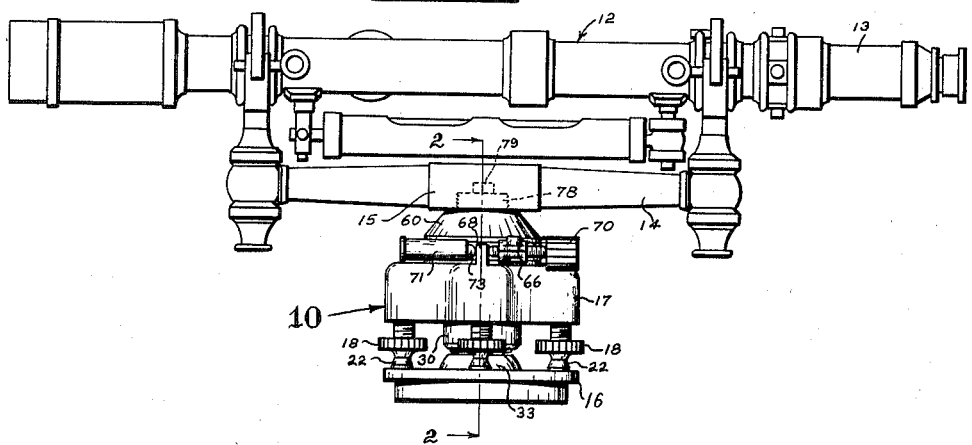
INVENTOR.
A. N. BRUNSON
BY
ATTORNEY.

July 16, 1940.  A. N. BRUNSON  2,208,014
SURVEYING INSTRUMENT
Filed May 6, 1938　　2 Sheets-Sheet 2
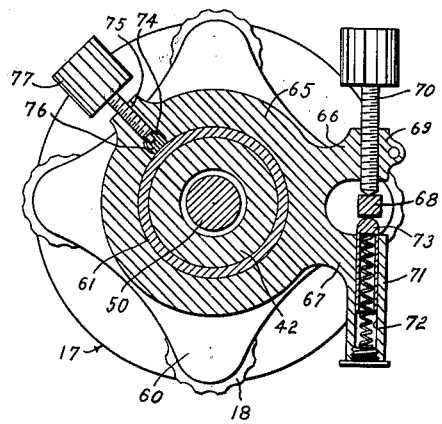
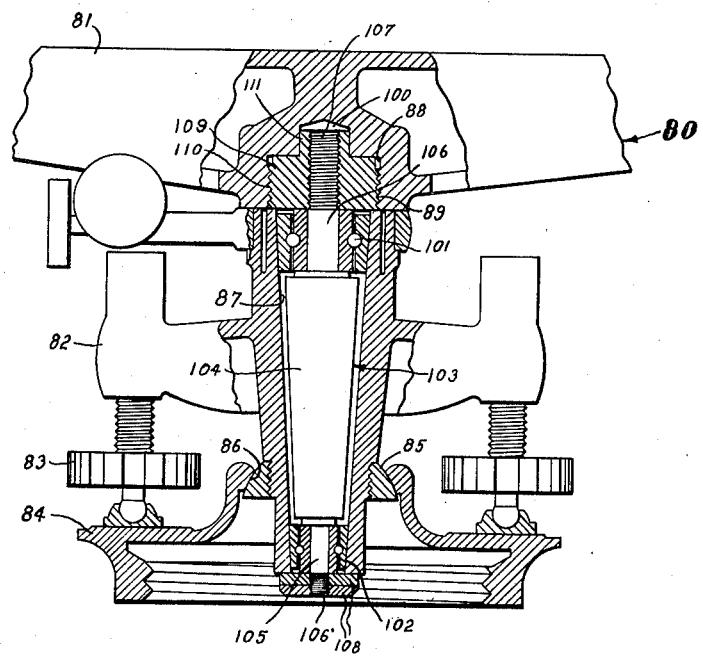
INVENTOR.
A. N. BRUNSON
BY
ATTORNEY.

Patented July 16, 1940

2,208,014

UNITED STATES PATENT OFFICE 2,208,014

SURVEYING INSTRUMENT

Amber N. Brunson, Kansas City, Mo.

Application May 6, 1938, Serial No. 206,422

6 Claims. (Cl. 248—180)

This invention relates to improvements in surveying instrument.

The general object of the invention is to provide an improved surveying instrument having novel features of construction which provide greater accuracy than is obtainable with former levels.

A further object of the invention is to provide a novel support for the telescope of a surveying instrument.

Another object of the invention is to provide an improved surveying instrument wherein the spindle is mounted in anti-friction bearings.

Another object of the invention is to provide an improved surveying instrument wherein the base, spindle and socket are dust-proof.

Another object of the invention is to provide an improved surveying instrument which may be operated with accuracy at low temperatures.

Another object of the invention is to provide an improved surveying instrument wherein the base will not interfere with the spindle accuracy irrespective of how tight the leveling screws may be tightened.

Another object of the invention is to provide an improved surveying instrument with a base designed so as to remain accurate irrespective of expansion and contraction of metals.

Another object of the invention is to provide an improved surveying instrument wherein the base may be disassembled and give access to the clamps and leveling screws and, at the same time, the spindle and socket will remain in a sealed unit.

Another object of the invention is to provide an improved surveying instrument wherein in revolving the instrument, the vial remains in center and makes reading instantaneous.

Other objects and the advantages of this invention will be apparent from the following description taken in connection with the accompanying drawings, wherein:

Fig. 1 is a side view of a surveying instrument embodying the features of my invention;

Fig. 2 is an enlarged section taken on line 2—2 of Fig. 1;

Fig. 3 is a section taken on line 3—3 of Fig. 2 on a reduced scale; and

Fig. 4 is a view similar to Fig. 2 showing a modification of my invention.

In the accompanying drawings I have shown my invention as embodied in an instrument which is indicated generally at 10 and I have shown my invention as embodied, for example, in a standard type of leveling instrument 12 mounted on the base 10. The instrument 12 includes the usual telescope 13 supported on a level bar 14 which includes a threaded socket portion 15.

As shown the base 10 includes a foot plate 16 on which a leveling screw base 17 is supported by a plurality of leveling screws 18. Each of the leveling screws 18 includes an enlarged head 19 having a threaded portion 20 thereabove and a depending portion which terminates in a ball member 21. Each of the leveling screw ball portions 21 fits in a socket 22 of a foot member 23 which engages the foot plate 16. Opening through the under face thereof the leveling screw base has a plurality of apertures 24 therein in which threaded bushings 25 are positioned to receive the threaded portion 20 of the leveling screws 18.

The leveling screw base 17 has a cavity 26 therein and therebelow a central recess 27 which opens into the cavity 26. The leveling screw base 17 has a central upwardly projecting hub 28 thereon having an aperture 29 therein. Depending therefrom the leveling screw base includes a hub portion 30 having an aperture 31 there in the upper end of which opens into the recess 27. The hub 30 has an enlarged recess 32 opening through the lower face thereof which communicates with the aperture 31.

The foot plate 16 includes a reduced upstanding central hub portion 33 and has a threaded recess 34 therein opening through its lower face. The hub portion 33 has a recess 35 therein which opens into the threaded recess 34 and a socket aperture 36 having semi-spherical side walls opening into the recess 35.

Mounted on the leveling screw base 17 I provide a spindle housing 37. As shown the spindle housing 37 includes an intermediate flange portion 38 and a downwardly extending portion 39 which is positioned in the aperture 31 and includes a protruding threaded portion 40.

Above the flange 38 the housing 37 includes a reduced cylindrical portion 41 having an enlarged head portion 42 thereon. Opening through the upper end thereof the housing head 42 has a recess 43 therein which forms a shoulder 43' and opening through the lower end the housing portion 39 has a recess 44 therein which forms a shoulder 44'. The housing 37 has a central aperture 45 therein which at the upper end opens into the recess 43 and at the lower end opens into the recess 44.

Positioned in the head recess 43 I provide an anti-friction bearing 46 of the dust-proof type and positioned in the lower recess 44 I provide a similar anti-friction bearing 47. Each of the bearings 46 and 47 is shown as of the radial thrust type and includes an inner and an outer element the upper bearing being preferably larger than the lower bearing.

Mounted on the threaded portion 40 of the housing 37 I provide a nut 48 which includes a reduced portion 48' to be positioned in the recess 32 of the hub 30. The nut 48 is adapted to be tightened against the face of the hub 30 until the lower face of the housing flange 38 is drawn into tight engagement with the bottom of the recess 27 to firmly secure the bearing housing 37 to the leveling screw base 17. Positioned on the threaded portion 40 of the bearing housing below the nut 48 and within the foot plate recess 35 I provide a nut member 49 having a semi-spherical surface engaging the foot plate aperture 36.

Positioned in the aperture 45 of the bearing housing 37 I provide a spindle member 50. Adjacent the lower end thereof the spindle includes a cylindrical portion 51 in which the inner element of the anti-friction bearing 47 is disposed so that this element is adjustable along the portion 51 of the spindle. Below the portion 51 the spindle includes a threaded portion 52 on which nuts 53 are positioned.

Adjacent the upper end thereof the spindle includes a cylindrical portion 54 which is positioned in the anti-friction bearing 46; above the portion 54 the spindle includes an enlarged flange portion 55. Above the flange 55 the spindle includes a threaded portion 56 and thereabove a reduced centering dowel portion 57.

When the spindle 50 is operatively assembled in the bearing housing 37 the spindle flange 55 directly engages the upper face of the inner raceway of the bearing 46 and the nuts 53 are tightened into engagement with the inner raceway of the bearing 47 thereby tightly clamping the outer raceway of the bearing 46 in engagement with the bottom of the recess 43 and the outer raceway of the bearing 47 into engagement with the bottom of the recess 44 thereby firmly retaining the spindle 50 in correct alignment in the bearing housing 37.

An externally threaded dust cap 58 engaging a similarly threaded portion 59 of the housing recess 44 is preferably provided on the lower end of the housing portion 39 to close the recess 44.

Mounted on the spindle 50 I provide a housing ring 60 which includes a reduced depending hub portion 61 and an upwardly extending reduced threaded hub 62.

The housing ring engages a chemically treated felt washer 61a which also engages the upper bearing 46 to provide a dust-proof seal. At the base of the hub portion 61 the housing ring includes a downwardly facing shoulder 61'. The housing ring 60 when tightened engages the flange 55 and forces this flange against the inner element of the bearing 46 and thus causes the outer element of the bearing 46 to engage the shoulder 43' so that the upper bearing is held tight while the inner element of the lower bearing is adjustable along the portion 51 so that when the nuts 53 are tightened the inner element of the lower bearing is moved towards the upper bearing and the pressure thus produced removes any film of oil which will have a tendency to cause inaccuracy.

My construction prevents shifting of centers due to any oil film on the shoulders or on the bearing and I find that I can seccure an accuracy to within three seconds of arc. Due to this construction all particles of sand, dust, etc., are kept from the socket and spindle so that the life of the instrument is lengthened. The ability to tighten the bearing by holding the outer elements thereof fixed and pulling the inner elements together insures greater accuracy since it furnishes the desired metal-to-metal contact without wear. This construction also assures removal of all vertical and horizontal play in the bearings and thus accuracy is secured and maintained. Further my construction allows free use of the instrument at temperatures well below zero degrees Fahrenheit at which temperature the former tapered bronze spindles either "freeze" or become so stiff that turning the spindle throws the instrument off the perfect horizontal plane.

The tapered bronze spindles do not contract as much in cold weather as the housing in which they operate. This causes the instrument to become very stiff in revolving. Also the higher temperatures cause the spindle housing to expand more than the spindle and this causes a looseness. In my construction the expansion and contraction of metal does not interfere with the accuracy nor does it interfere with the rotating of the spindle.

When an objective lens is extended out the full length it throws more weight on one end of the barrel than it does on the other. Other instruments have to be readjusted with the leveling screws to bring the level vial back in center while my instrument remains in the perfect horizontal plane because I have sufficient strength in the bearings and the ability to hold the upper and lower shoulders in metal-to-metal contact and have sufficient strength in the lower assembly to support the overhang or added weight caused by running the telescope slide in and out.

Other instruments have a looseness between the spindle and housing for a film of oil in order to turn the spindle freely. In revolving the instrument this looseness causes the vial to run from one end to the other. An engineer is required to wait until the vial comes to rest before taking his reading. My instrument has no film of oil on the shoulder contact and therefore the tapered portion does not engage the housing. With this method of construction I am able to revolve the spindle while the vials remain in perfect center so that the reading is instantaneous.

Opening through the bottom thereof the hub 61 has a recess 63 therein and opening through the top thereof the threaded hub 62 has a threaded aperture 64 therein which opens into the recess 63. The housing head 42 is positioned in the housing ring recess 63 and the threads of the threaded spindle hub 56 engage the threads of the threaded housing ring aperture 64.

Surrounding the housing ring hub 61 between the leveling screw base hub 28 and the housing ring shoulder 61' I provide a clamp ring 65 having a pair of spaced finger members 66 and 67 projecting outwardly therefrom which are positioned one at each side of an upstanding lug 68 on the leveling screw base 17. The finger 66 includes an enlarged internally threaded boss 69 in which an adjusting screw member 70 is positioned and which is adapted to engage one side of the lug 68. The other finger 67 includes an enlarged boss portion 71 having a chamber 72 therein in which a spring pressed plunger 73 is positioned and which is adapted to engage the face of the lug 68 opposite the screw 70. The outer diameter of the hub portion 61 of the housing ring is smaller than the diameter of the aperture 29 so that a space 73' is provided into which dust falls to keep the clamping ring free from grit.

At approximately one hundred and thirty five degrees from the fingers 66 and 67 the clamping ring 65 has a recess 74 therein opening through the inner face thereof and has a threaded aperture 75 opening into the recess in the recess 74 and through the extremity of the ring. Positioned in the recess 74 I provide a clamping shoe 76 and positioned in the threaded aperture I provide a clamping screw 77. When the clamping screw 77 is tightened it forces the clamping shoe 76 into tight engagement with the housing ring 60 thereby firmly clamping the housing ring 60 and the clamp ring 65 together. Thereafter any slight adjustment of the housing ring 60 may be accomplished by manipulating the adjusting screw 70.

The instrument 12 is mounted on my improved base 10 in the same manner as is customary with the usual type of base, that is the threaded hub 62 of the housing ring 60 is positioned in a similarly threaded aperture 78 of the level bar socket 15 with the centering dowel 57 positioned in a suitable recess 79 in the level bar socket 15.

In use the device 10 is adapted to be mounted on a standard type of tripod (not shown) and secured to the threaded boss of the tripod head by the foot plate threads 34.

In Fig. 4 I have indicated my engineer's level, which embodies a modified form of my invention, generally at 80. The level 80 as shown includes a level bar 81 which like the level bar shown in Fig. 1 supports a telescope sighting member not shown. The level 80 further includes a leveling screw base 82 which is supported by a plurality of leveling screws 83 on a foot plate 84 and is swivelly connected to the foot plate 84 in the usual manner by a semispherical member 85 thereon engaging a companion seat portion 86 of the foot plate.

The leveling screw base 82 has the usual central vertical downwardly convergent aperture 87 therein to receive a spindle. The level bar 81 includes a socket portion 88 having a threaded recess 89 therein with a reduced centering recess 100 opening through the bottom thereof. According to my invention I provide an upper spindle anti-friction bearing 101 and a lower spindle anti-friction bearing 102 which are positioned in the tapered aperture 87. The outer cages of the bearings 101 and 102 are tapered to conform to the taper of the aperture 87 and are of a diameter to fit one adjacent the upper end of the aperture and one adjacent the lower end thereof.

In the aperture 87 I arrange a spindle member 103 having a lower reduced portion 105 and an upper reduced portion 106. The lower portion 105 has a threaded portion 106' and the upper portion has a threaded portion 107. Nuts 108 engage the threaded portion 106' while a nut member 109 engages the threaded portion 107. The nut member 109 has external threads 110 engaging the threaded recess 89 and a reduced hub 111 engaging the centering recess 100. In use the device is mounted in the usual manner on a standard type of tripod.

From the foregoing description it will be apparent that I have invented a novel surveying instrument wherein the telescope element remains accurate under all conditions of use and where there are few parts employed.

Having thus described my invention I claim:

1. In a surveying instrument, a leveling screw base having an aperture, a bearing housing on said leveling screw base and extending through said aperture, a spindle member positioned in said housing, an anti-friction member engaging each end of said housing, means on the upper end of said spindle engaging one of said members, means at the other end of the spindle engaging the other member, a housing ring on said spindle, said ring having a skirt disposed in said aperture, said skirt having a diameter less than that of said aperture to provide an annular dirt receiving slot, and a clamp engaging said base and said ring.

2. In a surveying instrument, a foot plate, a hollow bearing housing having an internal shoulder at one end and mounted on said foot plate, said bearing housing having a flange thereon, a leveling screw base about said housing, said base having a recess, said flange being disposed in said recess, said housing having a boss, means engaging said bearing housing and said boss to hold said leveling screw base against the flange, a flange spindle in said housing, an aintí-friction member engaging said spindle and said internal shoulder, a housing ring on said spindle, the lower end of said bearing housing having an internal shoulder, a second anti-friction member engaging said last mentioned shoulder and said spindle, and means on the lower end of said spindle engaging the second anti-friction member.

3. In a surveying instrument, a leveling screw base having a cavity therein and having a central recess opening into the cavity, said base having a depending apertured hub, a spindle housing mounted in said leveling head and having an intermediate flange engaging the bottom wall of said recess, said spindle housing having a threaded lower end, a nut engaging said threaded end and said depending apertured hub, a housing ring having a recess, said spindle housing having a head fitted in said housing ring recess, said spindle housing having an internal, outwardly facing, shoulder adjacent each end thereof, a spindle in said housing, a bearing engaging each shoulder and means on the spindle engaging each of the bearings.

4. In a surveying instrument, a foot plate, a hollow bearing housing having an internal shoulder at one end and mounted on said foot plate, said bearing housing having a flange thereon, a leveling screw base about said housing, said base having a recess, said flange engaging the end wall of said recess, said housing having a boss, means engaging said bearing housing and said boss to hold said leveling screw base against the flange, a flanged spindle, an anti-friction member engaging said spindle and said internal shoulder, a housing ring on said spindle and having a skirt surrounding the upper end of said bearing housing, the lower end of said bearing housing having an internal shoulder, a second anti-friction member engaging said last mentioned shoulder and said spindle, and means on said spindle engaging the second anti-friction member.

5. In a surveying instrument, a leveling screw base having a cavity therein and having a central recess opening into the cavity, said base having an upwardly projecting apertured hub thereon and having a depending apertured hub, a spindle housing mounted in said leveling head and having an intermediate flange engaging the bottom wall of said recess, said spindle housing having a threaded lower end, a nut engaging said threaded end and said depending apertured hub, a housing ring having a recess, said housing ring having a flange disposed above said upwardly projecting hub, and having a depending hub portion disposed within said upwardly projecting hub, said spindle housing having a head fitted in said housing ring recess, said spindle housing having an internal outwardly facing shoulder adjacent each end thereof, a spindle in said housing, a bearing engaging each shoulder and means on the spindle engaging each of the bearings.

6. In a surveying instrument, a foot plate, a hollow bearing housing having an internal shoulder at one end and mounted on said foot plate, said bearing housing having a flange thereon, a leveling screw base about said housing, said base having a recess, said flange engaging the end wall of said recess, said housing having a boss, a nut threadedly engaging said bearing housing and engaging said boss to hold said leveling screw base against the flange, a flanged spindle, an anti-friction member engaging said spindle and said internal shoulder, a housing ring on said spindle and having a skirt surrounding the upper end of said bearing housing, the lower end of said bearing housing having an internal shoulder, a second anti-friction member engaging said last mentioned shoulder and said spindle, the lower end of said spindle being threaded and having a nut thereon engaging said second anti-friction member, and a dust cap engaging the lower end of said bearing housing.

AMBER N. BRUNSON.